UNITED STATES PATENT OFFICE.

ERNST OTTO SCHMIEL, OF GOHLIS, NEAR LEIPSIC, GERMANY.

PREPARING LITHOGRAPHIC SURFACES.

SPECIFICATION forming part of Letters Patent No. 376,554, dated January 17, 1888.

Application filed May 9, 1887. Serial No. 237,532. (No specimens.)

*To all whom it may concern:*

Be it known that I, ERNST OTTO SCHMIEL, of Gohlis, near Leipsic, Germany, have invented an Improved Process of Preparing Lithographic Stones and Zinc Plates, of which the following is a specification.

This invention relates to a new process of preparing lithographic stones and zinc plates ready for use without grinding. The process is to be applied to stones that are not susceptible and to those being too soft or containing too much lime.

In applying my process I proceed as follows: The stone or zinc plate is washed with benzine or an equivalent liquid to take away the dirt and color. It is then coated with a diluted acid—such as sulphuric acid or muriatic acid—to remove the old design, but without rendering the stone or plate susceptible for the new design. In order to produce this latter effect without grinding, a strong dilution of chloride of magnesia mixed with five or ten per centum of water glass is poured upon the stone or plate. This mixture is permitted to act upon the stone for from five to twenty minutes, while upon zinc plates it is to act from one to two days. The stone, with the chloride of magnesia upon it, is rubbed with pumice and cleaned, after which its surface will be in condition not only to receive carbonates of magnesia, but also to combine with them. A fine layer consisting of water and carbonate of magnesia is now rubbed upon the surface of the stone, so as to cause the carbonate of magnesia to combine with the body of the stone.

Zinc plates, after being treated with the chloride of magnesia and water glass, as described, are not treated with water and carbonate of magnesia, but they are impregnated with dissolved chloride of zinc and carbonate of magnesia. In this way the zinc plates will be caused to combine with the carbonate of magnesia.

Stones and zinc plates after being treated in accordance with this process are ready for use without being ground off.

I claim as my invention—

The process of treating lithographic stones and zinc plates, which consists of washing them with benzine, subjecting them to the action of a chloride, and then to the action of carbonate of magnesia, substantially as specified.

In testimony whereof I have signed my name to this specification in the presence of two subscribing witnesses.

ERNST OTTO SCHMIEL.

Witnesses:
 EDMUND BACHS,
 M. E. MATTHÄI.